US012158181B2

(12) United States Patent
Yim

(10) Patent No.: US 12,158,181 B2
(45) Date of Patent: Dec. 3, 2024

(54) CAGELESS BEARING AND TRANSMISSION

(71) Applicant: The Trustees of the University of Pennsylvania, Philadelphia, PA (US)

(72) Inventor: Mark Yim, St. Davids, PA (US)

(73) Assignee: The Trustees of the University of Pennsylvania, Pennsylvania, PA (US)

( * ) Notice: Subject to any disclaimer, the term of this patent is extended or adjusted under 35 U.S.C. 154(b) by 123 days.

(21) Appl. No.: 16/695,467

(22) Filed: Nov. 26, 2019

(65) Prior Publication Data

US 2020/0166075 A1 May 28, 2020

Related U.S. Application Data

(60) Provisional application No. 62/771,270, filed on Nov. 26, 2018.

(51) Int. Cl.
| F16C 19/28 | (2006.01) |
| F16C 33/34 | (2006.01) |
| F16C 33/58 | (2006.01) |
| F16H 13/00 | (2006.01) |
| F16H 13/08 | (2006.01) |

(52) U.S. Cl.
CPC ............ *F16C 19/28* (2013.01); *F16C 33/34* (2013.01); *F16C 33/58* (2013.01); *F16H 13/00* (2013.01); *F16H 13/08* (2013.01)

(58) Field of Classification Search
CPC .......... F16C 19/20; F16C 19/28; F16H 13/00
USPC ................................. 384/507, 513
See application file for complete search history.

(56) References Cited

U.S. PATENT DOCUMENTS

| 366,117 A | * | 7/1887 | Lake |
| 606,485 A | * | 6/1898 | Lawrence ............ F16C 33/3713 384/521 |
| 854,505 A | * | 5/1907 | Keiper |
| 1,995,978 A | | 3/1935 | Gotz |

(Continued)

FOREIGN PATENT DOCUMENTS

| EP | 0303228 A1 | | 2/1989 |
| EP | 1 002 476 | * | 7/2000 |
| FR | 2930807 | * | 11/2009 |

OTHER PUBLICATIONS

"Continuously variable transmission", Wikipedia.org, https://en.wikipedia.org/wiki/Continuously_variable_transmission, last edited Feb. 8, 2020, 21 pages.

(Continued)

*Primary Examiner* — William C Joyce
(74) *Attorney, Agent, or Firm* — BakerHostetler

(57) ABSTRACT

In one example, a bearing or transmission has an outer race that extends circumferentially about a central axis. An inner race is disposed within the outer race and extends circumferentially about the central axis so as to be coaxial with the outer race. A plurality of load-bearing rolling elements are disposed between the inner race and the outer race, and are spaced circumferentially from one another so as to not contact one another. A plurality of separator rolling elements are disposed within the outer race. Each separator rolling element is disposed between a respective pair of the load-bearing rolling elements such that the separator rolling element is in rolling contact with the load-bearing rolling elements of the respective pair. The load-bearing and separator rolling elements form a contiguous ring.

25 Claims, 8 Drawing Sheets

(56) References Cited

U.S. PATENT DOCUMENTS

| | | | |
|---|---|---|---|
| 3,938,865 A | | 2/1976 | Rouverol |
| 3,945,270 A | | 3/1976 | Nelson et al. |
| 4,141,607 A | * | 2/1979 | Traut .................... F16C 33/605 |
| | | | 384/521 |
| 4,487,090 A | | 12/1984 | Burnham |
| 6,394,656 B1 | | 5/2002 | Williams |
| 8,052,330 B2 | | 11/2011 | Kawashima |
| 8,425,121 B2 | * | 4/2013 | Casteras .............. F16C 19/163 |
| | | | 384/521 |
| 8,783,958 B2 | | 7/2014 | Kawashima |
| 9,593,718 B2 | * | 3/2017 | Kario .................... F16C 33/585 |
| 2012/0039557 A1 | * | 2/2012 | Casteras ................ F16C 19/20 |
| | | | 384/521 |
| 2015/0308495 A1 | * | 10/2015 | Fatania ................ F16C 19/166 |
| | | | 384/513 |

OTHER PUBLICATIONS

"Epicyclic gearing", Wikipedia.org, https://en.wikipedia.org/wiki/Epicyclic_gearing, last edited Jan. 7, 2020, 12 pages.

Enviolo, "Introducing NuVinci® CVP Technology", https://www.youtube.com/watch?v=kN8CCY1vFC8&feature=youtu.be, Fallbrook Technologies, May 28, 2014, 1 page.

Limer, "Genius Greaseless Bearings Spin With 10 Times Less Friction", Popular Mechanics, May 18, 2015, 6 pages.

Orbital Traction, "We make rotating machines more efficient", http://www.orbitaltraction.com/, date accessed Feb. 26, 2020, 1 page.

* cited by examiner

CAGELESS BEARING AND TRANSMISSION

CROSS REFERENCE TO RELATED APPLICATION

This application claims the benefit of U.S. Provisional Patent Application No. 62/771,270, filed Nov. 26, 2018, the entirety of which is incorporated herein by reference.

BACKGROUND

Bearings are commonly used in various applications to reduce friction between a stationary part and a rotating part or between two different parts that are rotating at different velocities. Typically, a bearing includes i) an inner race that rigidly attaches to a shaft, ii) an outer race that rigidly attaches to an element that either rotates relative to the shaft or is stationary as the shaft rotates, iii) a plurality of balls that roll on the inner and outer races, and iv) a retainer or cage that maintains spacing between the balls. In some bearings, the retainer or cage is omitted. However, a common problem with conventional bearings is that they have parts that are in sliding contact relative to one another, as opposed to rotating contact. This sliding contact increases friction, resulting in a loss of energy.

SUMMARY

In one example, an apparatus comprises an outer race, an inner race, a plurality of load-bearing rolling elements, and a plurality of separator rolling elements. The outer race extends circumferentially about a central axis. The inner race is disposed within the outer race and extends circumferentially about the central axis so as to be coaxial with the outer race. The plurality of load-bearing rolling elements are disposed between the inner race and the outer race, and are spaced circumferentially from one another so as to not contact one another. Each separator rolling element is disposed between a respective pair of the load-bearing rolling elements such that the separator rolling element is in rolling contact with the load-bearing rolling elements of the respective pair.

BRIEF DESCRIPTION OF THE DRAWINGS

The following detailed description will be better understood when read in conjunction with the appended drawings, in which there is shown in the drawings examples for the purposes of illustration. It should be understood, however, that the present disclosure is not limited to the precise arrangements and instrumentalities shown. In the drawings.

DETAILED DESCRIPTION

Figure 1:
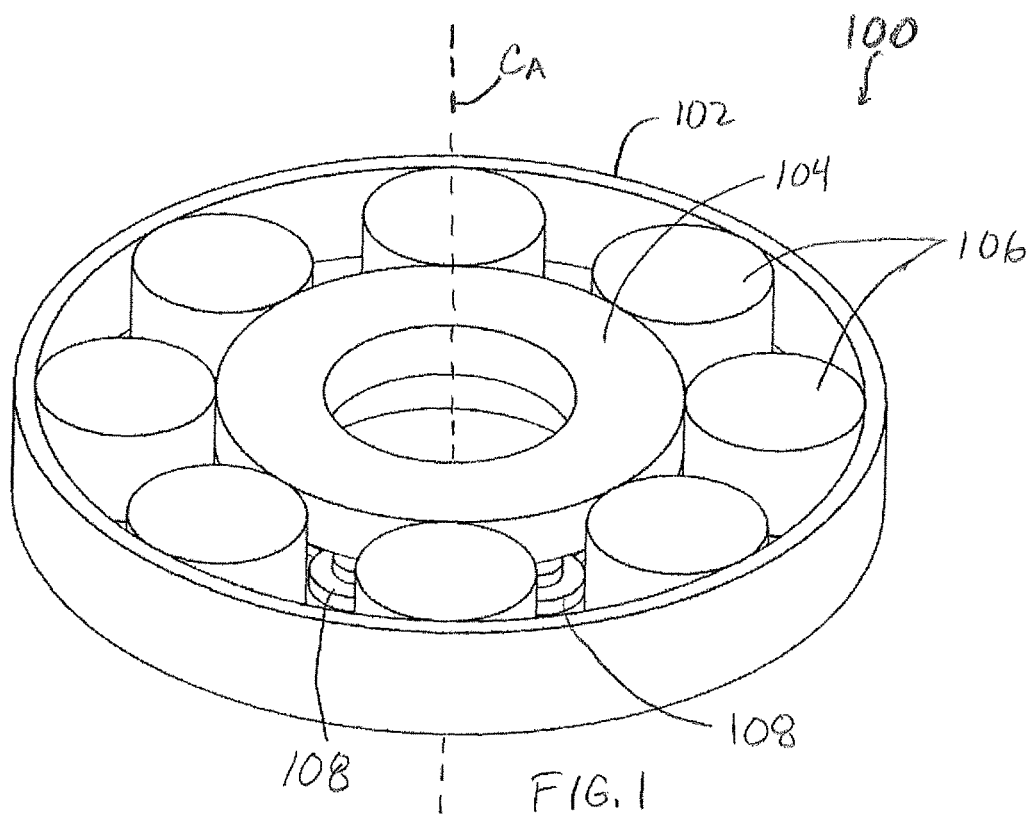
FIG. 1 shows an assembled perspective view of a bearing according to one example.
Figure 2:
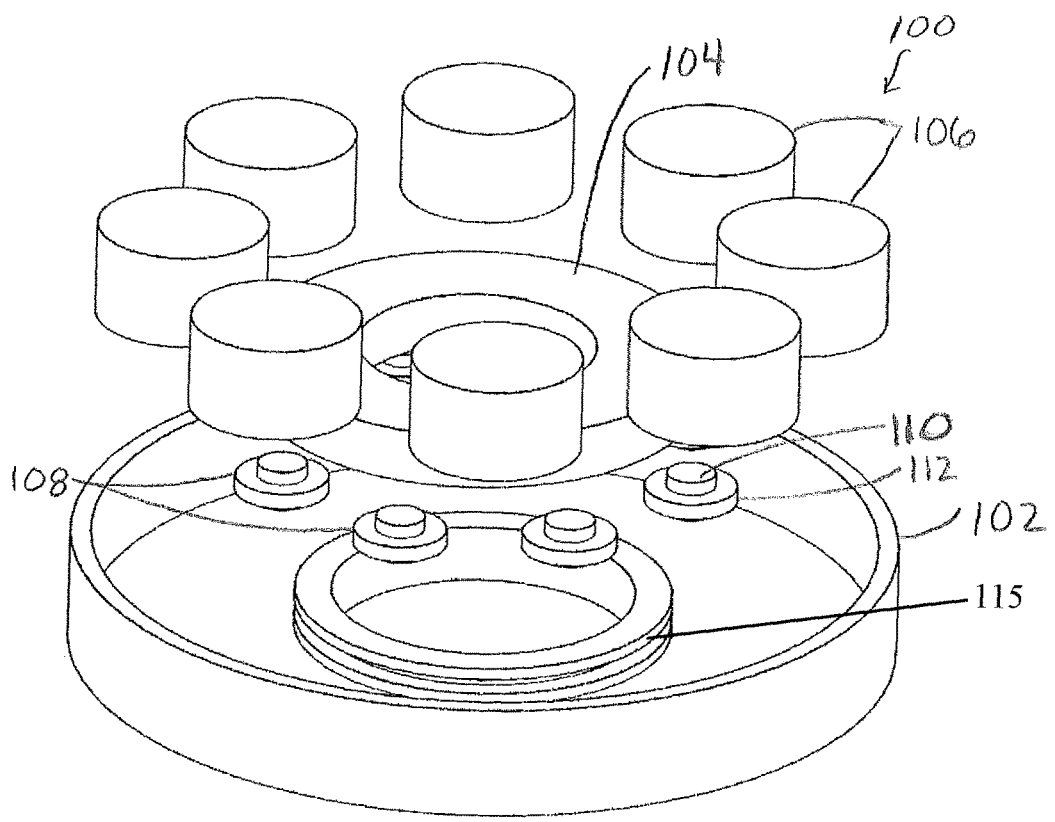
FIG. 2 shows an exploded perspective view of the bearing of FIG. 1.
Figure 3:
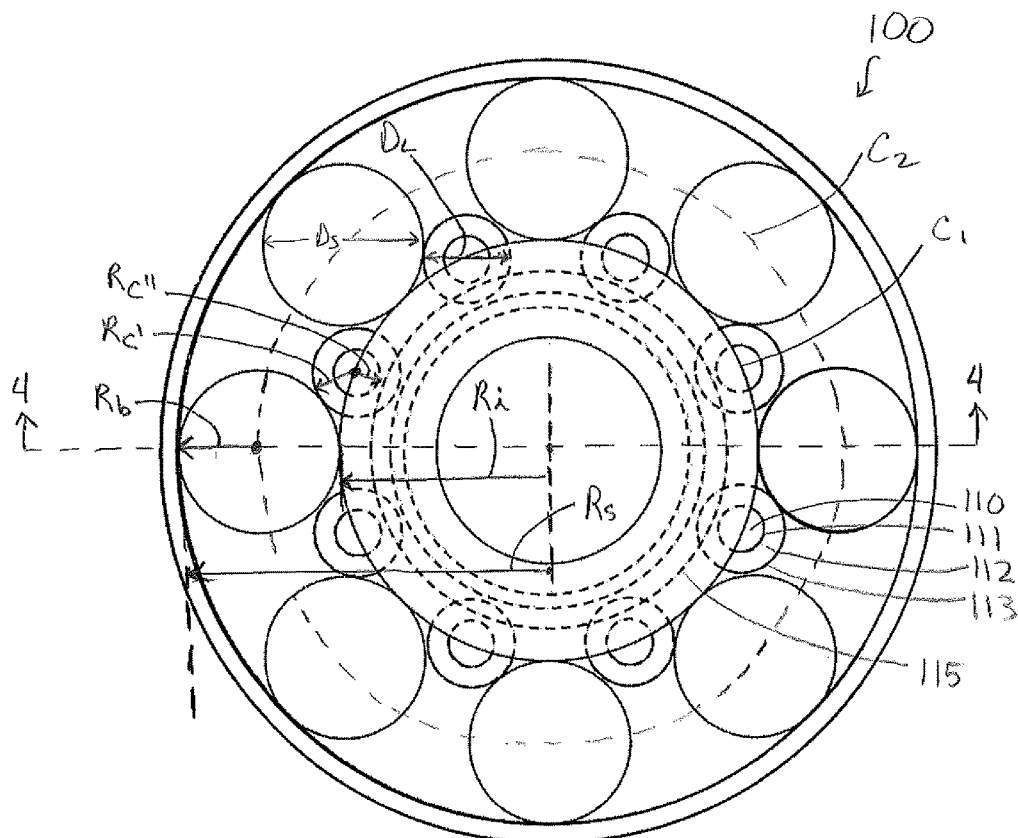
FIG. 3 shows a top plan view of the bearing of FIG. 1.
Figure 4:
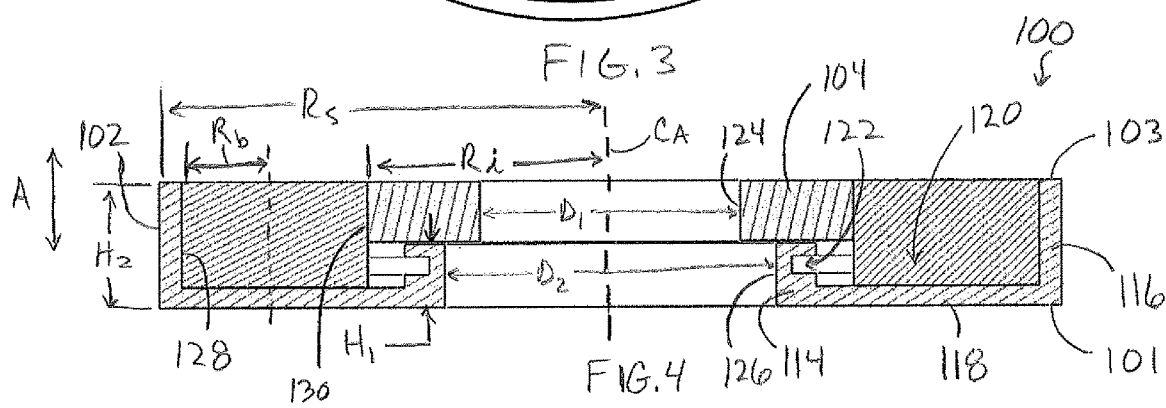
FIG. 4 shows a cross-sectional view of the bearing of FIG. 1 at section 4-4.
Figure 5:
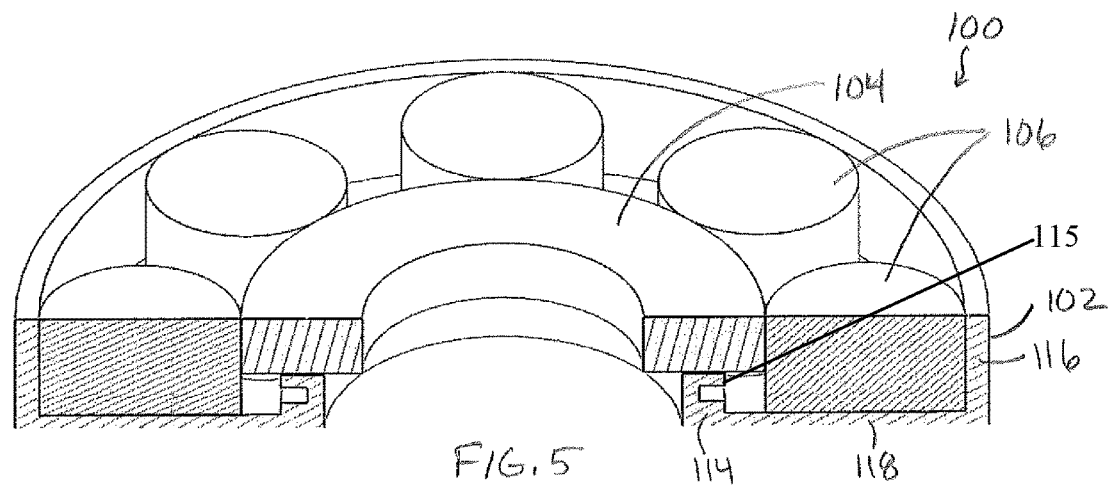
FIG. 5 shows a cross-sectional perspective view of the bearing of FIG. 1 at section 4-4.
Figure 6:
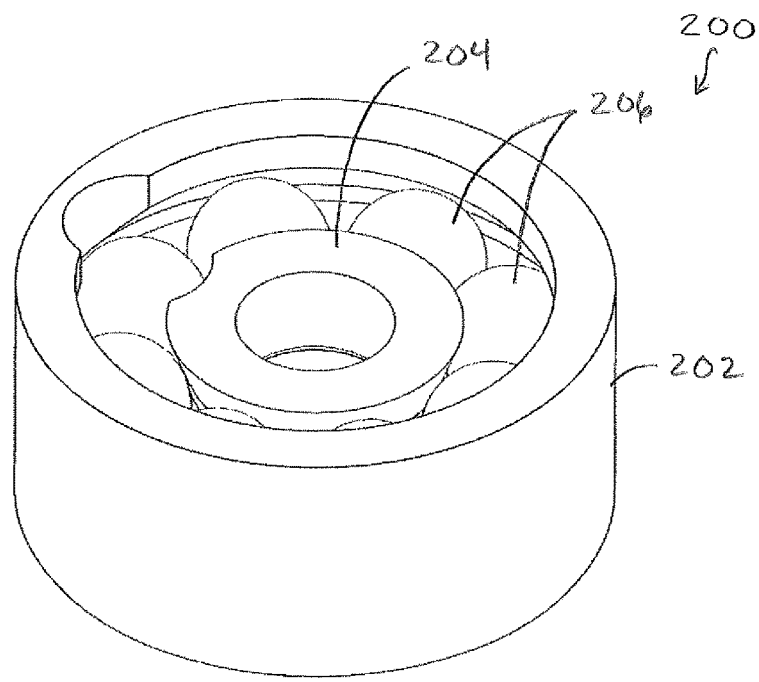
FIG. 6 shows an assembled perspective view of a bearing according to another example.
Figure 7:
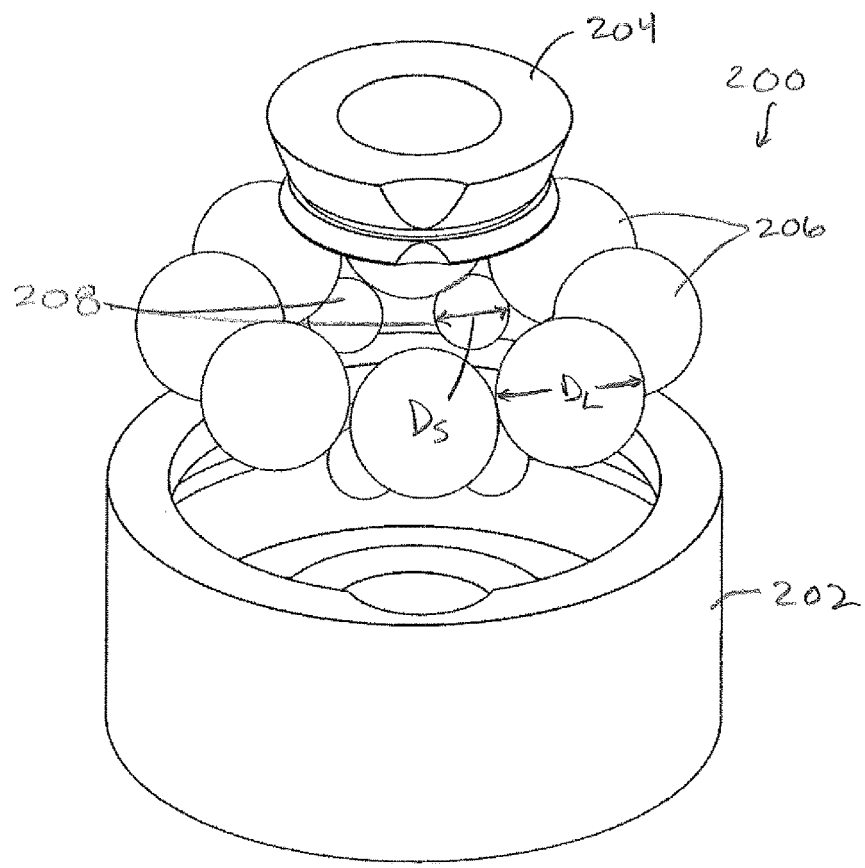
FIG. 7 shows an exploded perspective view of the bearing of FIG. 6.
Figure 8:
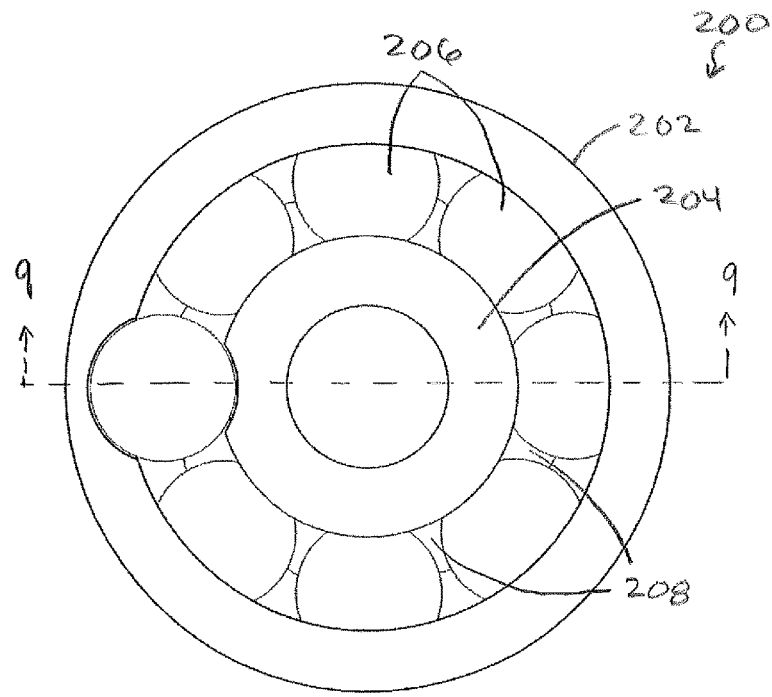
FIG. 8 shows a top plan view of the bearing of FIG. 6.
Figure 9:
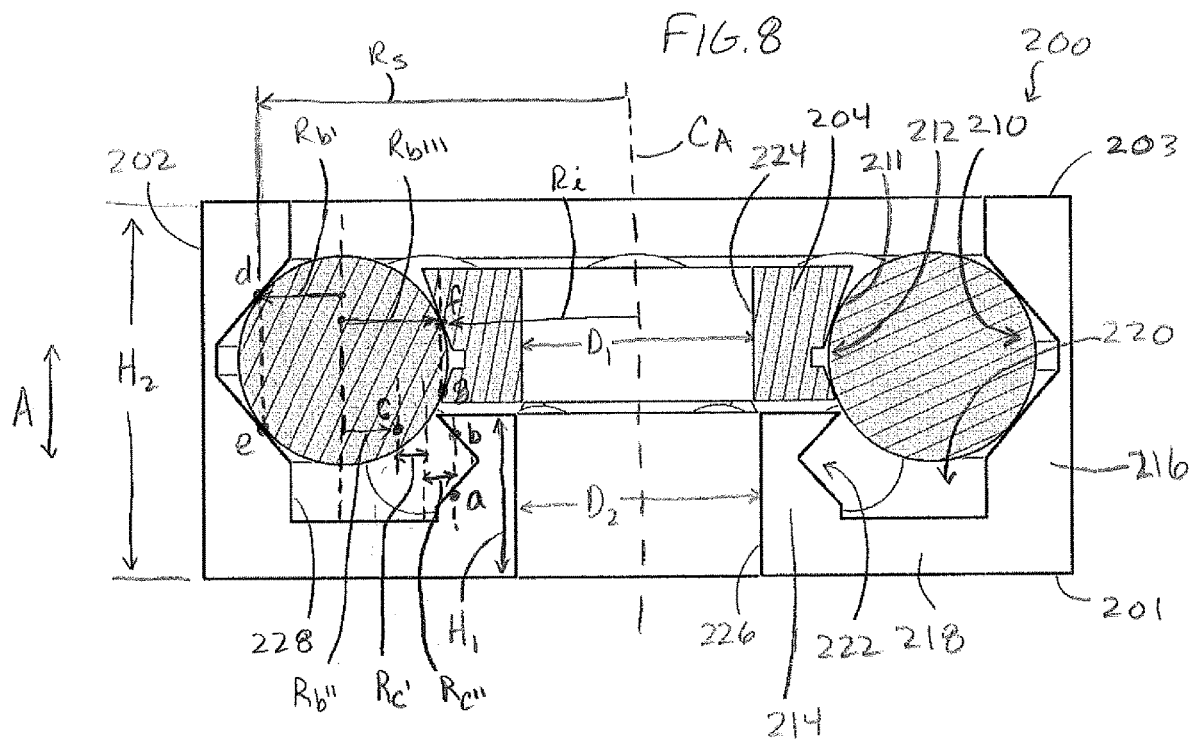
FIG. 9 shows a cross-sectional view of the bearing of FIG. 6 at section 9-9.

The present disclosure relates to bearings and transmissions having rolling elements with little to no sliding contact with other rolling elements or non-rolling elements such as a retainer or cage. The result is a relatively highly efficient system with limited to no sliding losses and limited to no incidental contact between rolling elements.

Referring to FIGS. 1 to 5, a bearing 100 is shown according to one example. The bearing 100 comprises an outer race 102, an inner race 104, a plurality of load-bearing rolling elements 106, and a plurality of separator rolling elements 108. The bearing 100 has a first end 101 and a second end 103 that are spaced from one another along an axial direction A that is parallel to a central axis $C_A$ of the bearing 100. The outer race 102 extends circumferentially about the central axis $C_A$. The outer race 102 can be formed as a one-piece body or can be formed of multiple parts that are rotationally fixed relative to one another. The inner race 104 is disposed within the outer race 102 and extends circumferentially about the central axis $C_A$ so as to be coaxial with the outer race 102. The plurality of load-bearing rolling elements 106 are disposed between the inner race 102 and the outer race 104, and are spaced circumferentially from one another so as to not contact one another. Each separator rolling element 108 is disposed between a respective pair of the load-bearing rolling elements 106 such that the separator rolling element 108 is in rolling contact with the load-bearing rolling elements 106 of the respective pair and with the outer race 102. The load-bearing rolling elements 106 are in rolling contact with the outer race 102, the inner race 104, and the separator rolling elements 108. The bearing 100 can have an equal number of load-bearing rolling elements 106 and separator rolling elements 108.

In this example, the load-bearing rolling elements 106 each have a cylindrical shape. Further, the separator rolling elements 108 each have a cylindrical shaft 110 and an annular collar 112 disposed about the cylindrical shaft 110 such that the cylindrical shaft 110 extends in opposite directions from the annular collar 112. The cylindrical shaft 110 and annular collar 112 are concentric with one another. The annular collar 112 of each separator rolling element 108 has an outer curved surface 113 that is in rolling contact with the load-bearing rolling elements 106 of a respective pair of the load-bearing rolling elements 106. The cylindrical shaft 110 has an outer surface 111 that is in rolling contact with an internal surface 115 (labeled in FIG. 5) of the outer race 102. The separator rolling elements 108 each have an outer-most diameter $D_S$ that is smaller than an outer-most diameter $D_L$ of each load-bearing rolling element 106. Further, the separator rolling elements 108 each have a geometric center that is disposed on a first circle $C_1$, and the load-bearing rolling elements 106 each have a geometric center that is disposed one a second circle $C_2$ that has a diameter that is larger than that of the first circle $C_1$. It will be understood that, in alternative examples, the separator rolling elements 108 can each have an outer-most diameter $D_S$ that is larger than or equal to an outer-most diameter $D_L$ of each load-bearing rolling element 106.

The outer race 102 comprises a curved inner wall 114 and a curved outer wall 116, each extending circumferentially about the central axis $C_A$. The curved inner wall 114 is spaced radially inward from the curved outer wall 116 so as to define a channel 120 between the curved inner wall 114 and the curved outer wall 116. It will be understood that the terms "radially" and "radial direction" refer to a direction that is perpendicular to the central axis $C_A$. The channel 120 can have a generally annular shape. The channel 120 receives the load-bearing rolling elements 106. The curved inner wall 114 defines at least one recess 122 that extends into the curved inner wall 114 in a direction that extends towards the central axis $C_A$. The at least one recess 122 can have a generally annular shape. The at least one recess 122 is configured to receive at least a portion of each of the separator rolling elements 108, such as the annular collar 112 of each separator rolling element 108. The at least one recess 122 can have a cross-section that has a rectangular shape, or any other suitable shape for receiving the separator rolling elements 108.

The outer race 102 can further comprise an end wall 118 that extends at the first end 101 from the curved inner wall 114 to the curved outer wall 116. The curved inner wall 114 and the curved outer wall 116 each have a height $H_1$ and $H_2$, respectively, measured from the first end 101 along the axial direction A. The height $H_1$ of the curved inner wall 114 is smaller than the height $H_2$ of the curved outer wall 116. The curved inner wall 114 is disposed between the first end 101 and the inner race 104 along the axial direction A. For example, the curved inner wall 114 and inner race 104 can be in-line with one another along the axial direction A. The curved inner wall 114 and the inner race 104 each have an inner surface (126 and 124, respectively) that faces the central axis $C_A$. The inner surface 124 of the inner race 104 has a diameter $D_1$ that can be smaller than a diameter $D_2$ of the inner surface 126 of the curved inner wall 114.

The curved inner wall 114 occupies space that could otherwise be used to extend the height of the inner race 104 along the axial direction A. As the height of the inner race 104 is made smaller, the load carrying ability and lifespan of the rollers and races decreases. Conversely, as the height of the inner race 104 is made larger, the load carrying ability and lifespan of the rollers and races increases. Therefore, it is desirable to limit the height $H_1$ of the curved inner wall 114 so as to allow for the height of the inner race 104 to be made larger.

In at least some examples, a benefit of having the separator rolling elements 108 (besides enabling only rolling contacts) can be that the chain of rolling elements 106 and 108 forms a ring that can distribute forces evenly. The radial and circumferential positions of the rolling elements 106 and 108 can be maintained by the rolling elements 106 and 108, and the rolling elements 106 and 108 form a loop that can constrain them to be in a circle. In conventional bearings that employ a cage, the relative position of the rolling elements relative to one another is constrained by the cage while the structure is under load, and as a result, only a subset of the rolling elements bear the load. This is because the outer race, when loaded, moves or deforms slightly and then engages a few of the rolling elements. These rolling elements push against the inner race, but are held in relative position to other rolling elements by the cage. In at least some examples of the present disclosure, loading on the rolling elements can cause them to move and push against their neighboring rolling elements. Thus, the forces can be more evenly distributed among the rolling elements leading to lower contact forces and better wear conditions.

The outer race 102 has a curved internal contact surface 128 that contacts the load-bearing rolling elements 106 and has an outer race radius $R_s$. The inner race 104 has a curved outer contact surface 130 that contacts the load-bearing rolling elements 106 and has an inner race radius $R_i$. The cylindrical shaft 110 of each separator rolling element 108 has a shaft radius $R_{c''}$, and the annular collar 112 of each separator rolling element 108 has a collar radius $R_{c'}$. A ratio $R_{c'}/R_{c''}$ of the collar radius to the shaft radius can be substantially equal to a ratio $R_s/R_i$ of the outer race radius to the inner race radius (i.e., $R_{c'}/R_{c''} \approx R_s/R_i$). When these ratios are equal, the surface velocity of the separator rolling elements 108 can substantially match the surface velocity of the load-bearing rolling elements 106. Matching the surface velocities of the separator rolling elements 108 and the load-bearing rolling elements 106 can result in rolling contact between the separator rolling elements 108 and the load-bearing rolling elements 106 with limited, if any, sliding contact between these elements.

Although not shown, the bearing 100 can include retaining features that prevent the load-bearing rollers 106 from falling out of the second end 103. For example, each load-bearing roller 106 can have an external surface that is curved as it extends along the axial direction, and the inner surfaces of the inner and outer races 102 and 104 can be curved to match the curved external surfaces of the load-bearing rollers 106. In some examples, each load-bearing roller 106 can have an hourglass like shape. Retaining features for retaining rollers can be found in U.S. Pat. No. 6,394,656, the contents of all of which are hereby incorporated by reference as if set forth in their entirety herein. Preferably, the retaining features are not in sliding contact with any of the parts of the bearing 100.

Turning now to FIGS. 6 to 9, a bearing 200 is shown according to another example. The bearing 200 comprises an outer race 202, an inner race 204, a plurality of load-bearing rolling elements 206, and a plurality of separator rolling elements 208. The bearing 200 has a first end 201 and a second end 203 that are spaced from one another along an axial direction A that is parallel to a central axis $C_A$ of the bearing 200. The outer race 202 extends circumferentially about the central axis $C_A$. The outer race 202 can be formed as a one-piece body or can be formed of multiple parts that are rotationally fixed relative to one another. The inner race 204 is disposed within the outer race 202 and extends circumferentially about the central axis $C_A$ so as to be coaxial with the outer race 202. The plurality of load-bearing rolling elements 206 are disposed between the inner race 202 and the outer race 204, and are spaced circumferentially from one another so as to not contact one another. Each separator rolling element 208 is disposed between a respective pair of the load-bearing rolling elements 206 such that each separator rolling element 208 is in rolling contact with the load-bearing rolling elements 206 of a respective pair and with the outer race 202. The load-bearing rolling elements 206 are in rolling contact with the outer race 202, the inner race 204, and the separator rolling elements 208. The bearing 200 can have an equal number of load-bearing rolling elements 206 and separator rolling elements 208.

In this example, each of the load-bearing rolling elements 206 and each of the separator rolling elements 208 has a spherical shape. The outer surface of each separator rolling element 208 is in rolling contact with the load-bearing rolling elements 206 of a respective pair of the load-bearing rolling elements 206, and with the outer race 202. The separator rolling elements 208 each have an outer-most diameter $D_S$ that is smaller than an outer-most diameter $D_L$ of each load-bearing rolling element 206. Further, the separator rolling elements 208 each have a geometric center that is disposed on a first circle, and the load-bearing rolling elements 206 each have a geometric center that is disposed one a second circle that has a diameter that is larger than that of the first circle.

The outer race 202 comprises a curved inner wall 214 and a curved outer wall 216, each extending circumferentially about the central axis $C_A$. The curved inner wall 214 is spaced radially inward from the curved outer wall 216 so as to define a channel 220 between the curved inner wall 214 and the curved outer wall 216. The channel 220 can have a generally annular shape. The curved inner wall 214 defines at least one recess 222 that extends into the curved inner wall 214 in a direction that extends towards the central axis $C_A$. The at least one recess 222 can have a generally annular shape. The at least one recess 222 is configured to receive the separator rolling elements 208. The at least one recess 222 can have cross-section that has a substantially "v-shape" as it extends into the curved inner wall 214, a truncated "v-shape" with the bottom of the "v" being flattened, or any other suitable shape. The recess 222 defines two points of contact "a" and "b" with each separator rolling element 208. The two points of contact "a" and "b" can be aligned along a line that is substantially parallel to the central axis $C_A$. Each separator rolling element 208 can further have a point of contact "c" with each load-bearing rolling element 206 of a respective pair of load-bearing roller elements 206.

The curved outer wall 216 of the outer race 202 defines at least one recess 210 that extends into the curved outer wall 216 in a direction that extends away from the central axis $C_A$. The at least one recess 210 is configured to receive the load-bearing rolling elements 206. Further, the at least one recess 210 can have a substantially "v-shape" as it extends into the curved outer wall 216, can have a truncated "v-shape" with the bottom of the "v" being flattened, or can have any other suitable shape. The recess 210 defines two points of contact "d" and "e" with each load-bearing rolling element 206. The two points of contact "d" and "e" can be aligned along a line that is substantially parallel to the central axis $C_A$.

The outer race 202 can further comprise an end wall 218 that extends at the first end 201 from the curved inner wall 214 to the curved outer wall 216. The curved inner wall 214 and the curved outer wall 216 each have a height $H_1$ and $H_2$, respectively, measured from the first end 201 along the axial direction A. The height $H_1$ of the curved inner wall 214 is smaller than the height $H_2$ of the curved outer wall 216. The curved inner wall 214 is disposed between the first end 201 and the inner race 204 along the axial direction A. For example, the curved inner wall 214 and inner race 204 can be in-line with one another along the axial direction A. The curved inner wall 214 and the inner race 204 each have an inner surface (226 and 224, respectively) that faces the central axis $C_A$. The inner surface 224 of the inner race 204 has a diameter $D_1$ that is smaller than a diameter $D_2$ of the inner surface 226 of the curved inner wall 214.

The curved inner wall 214 occupies space that could otherwise be used to extend the height of the inner race 204 along the axial direction A. As the height of the inner race 204 is made smaller, the load carrying ability and lifespan of the rollers and races decreases. Conversely, as the height of the inner race 204 is made larger, the load carrying ability and lifespan of the rollers and races increases. Therefore, it is desirable to limit the height $H_1$ of the curved inner wall 214 so as to allow for the height of the inner race 204 to be made larger.

The inner race 204 has an outer curved surface 211 that extends circumferentially around the central axis A. The outer curved surface 211 can define at least one recess 212 that extends into the outer curved surface 211 towards the central axis $C_A$. The at least one recess 212 is configured to receive the load-bearing rolling elements 206. Further, the at least one recess 212 can have a substantially "v-shape" as it extends into the curved outer surface 211, can have a truncated "v-shape" with the bottom of the "v" being flattened, or can have any other suitable shape. The recess 212 defines two points of contact "f" and "g" with each load-bearing rolling element 206. The two points of contact "f" and "g" can be aligned along a line that is substantially parallel to the central axis $C_A$.

In a preferred example, the contact surfaces of the inner and outer races 204 and 206 can be ruled surfaces. Aligning contact points "d" and "e" with one another and contact points "f" and "g" with one another as discussed above enables each load-bearing rolling element 206 to have an axis of rotation that is substantially parallel to the central axis $C_A$. Further, the angled contact surfaces that define the recesses 210, 212, and 222 restrict movement of the rolling elements 206 and 208 along the axial direction A such that cages or retainers are not needed to retain the rolling elements 206 and 208 in position.

The bearing 200 has an outer contact radius $R_s$ measured from the central axis $C_A$ to a contact point (e.g., "d" or "e") between the outer race 202 and a respective one of the load-bearing rolling elements 206. The inner race 204 has an inner contact radius $R_i$ measured from the central axis $C_A$ to a contact point (e.g., "f" or "g") between the inner race 202 and one of the load-bearing rolling elements 206. The bearing 200 has a length $R_{b'}$ measured from a central axis of the respective one of the load-bearing rolling elements 206 to the outer contact point (e.g., "d" or "e"). The bearing 200 further has a length $R_{b''}$ measured from the central axis of the respective one of the load-bearing rolling elements 206 to the contact point "c" between a load-bearing rolling element 206 and a separator rolling element 208. The bearing yet further has a length $R_{c'}$ measured from contact point "c" to the central axis of one of the separator rolling elements 208. The bearing 200 yet further has a length $R_{c''}$ that is measured from a central axis of a respective one of the separator rolling elements 208 to one of the contact points "a" and "b" along the radial direction. A ratio $$\frac{R_s}{R_i}$$

can be substantially equal to $$\frac{R_b}{R_{b''}}, \frac{R_c}{R_{c''}}.$$

When these ratios are equal, the surface velocity of the separator rolling elements 208 can substantially match the surface velocity of the load-bearing rolling elements 206. Matching the surface velocities of the separator rolling elements 208 and the load-bearing rolling elements 206 can result in rolling contact between the separator rolling elements 208 and the load-bearing rolling elements 206 with limited, if any, sliding contact between these elements.

In some examples, the rolling elements 206 and 208 can be in contact with one another with no spaces there between. In theory, if all of the dimensions were perfect, then ideal rolling would occur at all contact points. Any imprecision in the dimensions may lead to sliding friction or binding. Therefore, the separator rolling elements 208 can be made of a material that has low coefficient of friction or can have a low friction coating. In addition, at least one of the load-bearing elements 206 can be made of a material that has low coefficient of friction or can have a low friction coating.

In alternative examples, the rolling elements 206 and 208 can be sized so as to leave gaps between the load-bearing rolling elements 206 and the separator rolling elements 208. The separator rolling elements 208 need only contact the load-bearing rolling elements 206 to keep them from contacting each other. In such examples, if contact between a separator rolling element 208 and a load-bearing rolling element 206 occurs, then the surface velocity of the separator rolling element 208 should substantially match the surface velocity of the load-bearing rolling element 206 so that no sliding occurs between the elements 206 and 208. However, if the ratio $R_c/R_{c''}$ not is off due to imprecision, then some sliding may occur.

Since sliding contact in bearing 200 is limited during rotations, the load-bearing rolling elements 206 can have a larger coefficient of friction without impairing efficiency. Consequently, the inventor discovered that the bearing 200 can be modified as discussed below in relation to FIGS. 10 to 12 to form a friction-based, high-ratio speed reducer that can have a low profile, low cost, and/or low noise.

Figure 10:
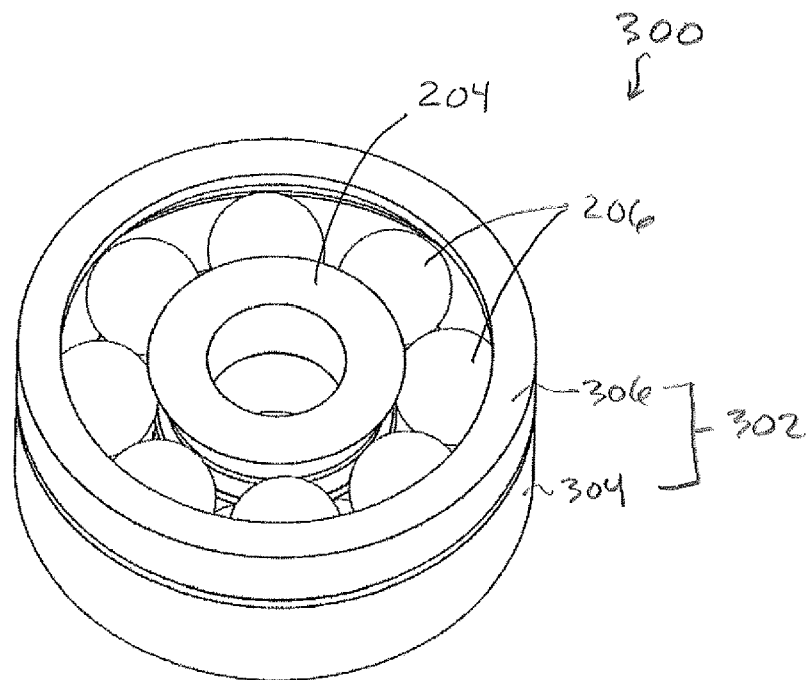
FIG. 10 shows an assembled perspective view of a transmission according to one example.
Figure 11:
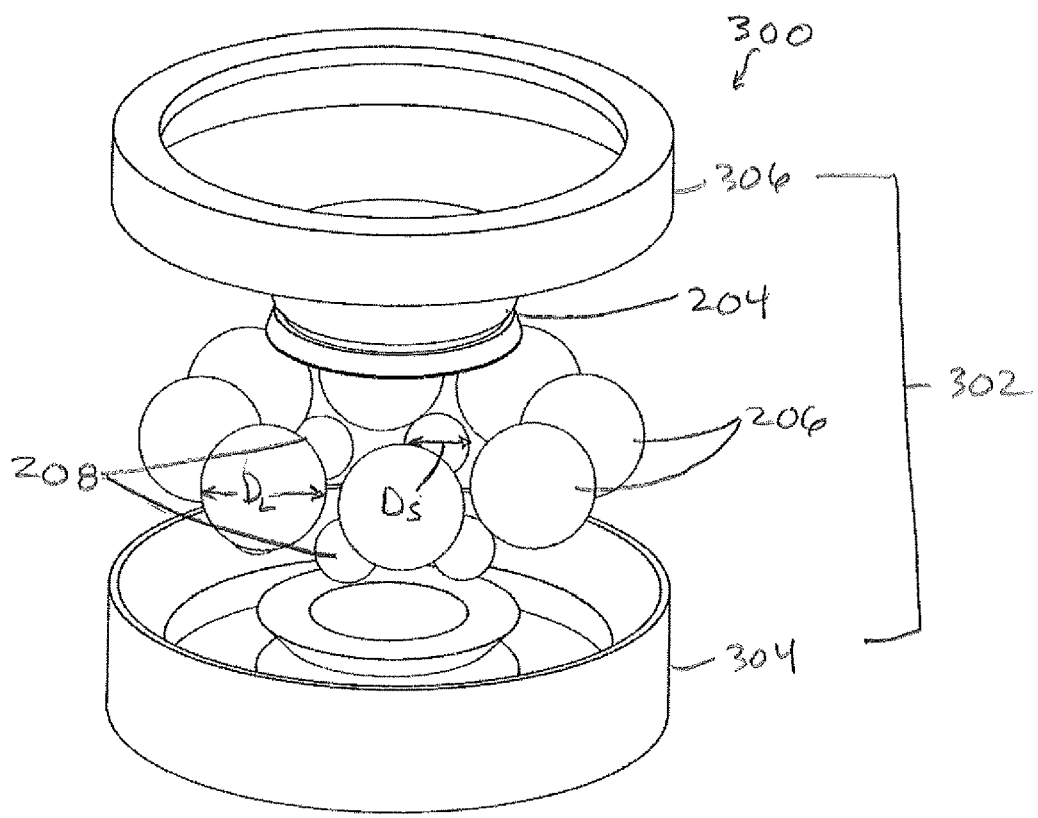
FIG. 11 shows an exploded perspective view of the transmission of FIG. 10.
Figure 12:
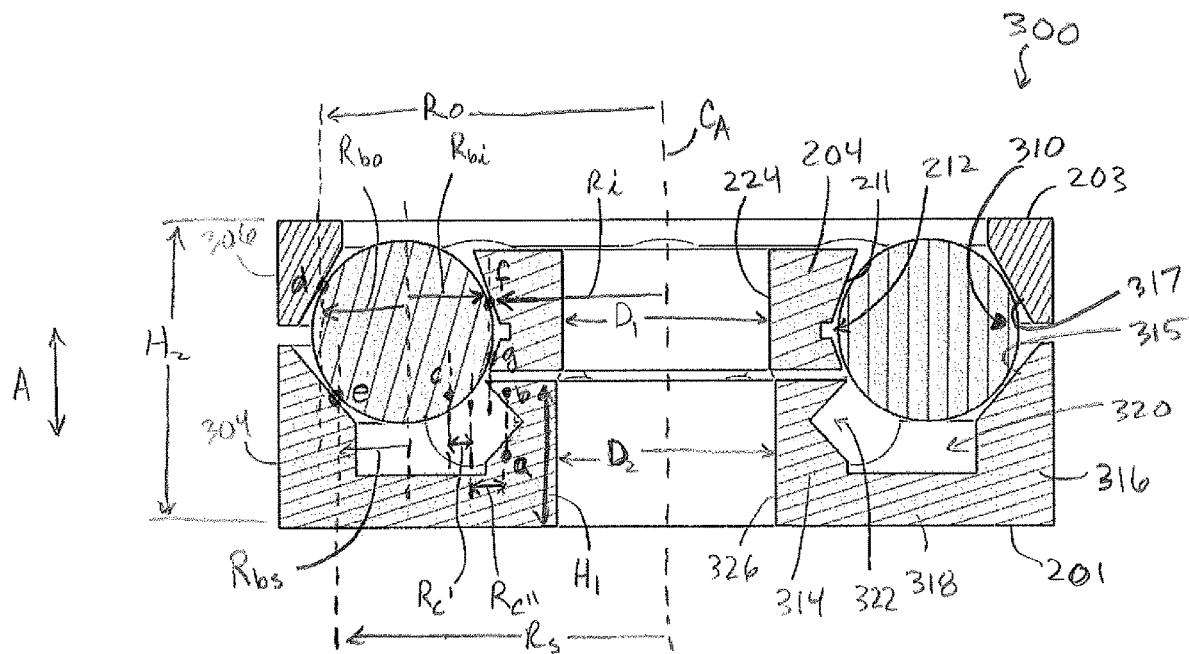
FIG. 12 shows a cross-sectional view of the transmission of FIG. 10 in a plane that extends through two of the load-bearing rolling elements.
Figure 13:
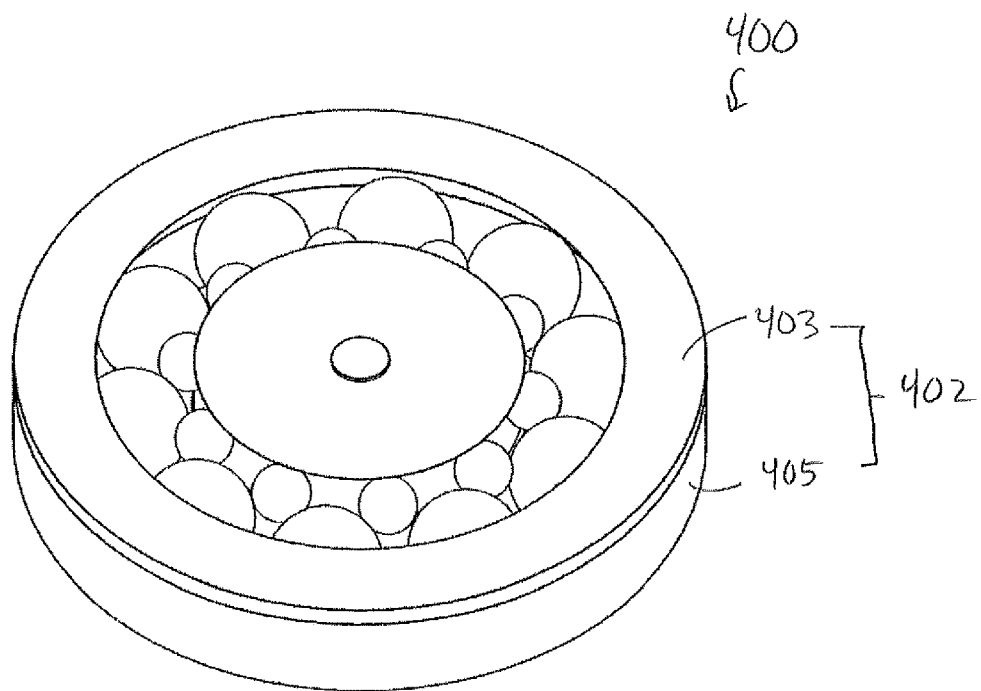
FIG. 13 shows an assembled perspective view of a transmission according to another example.
Figure 14:
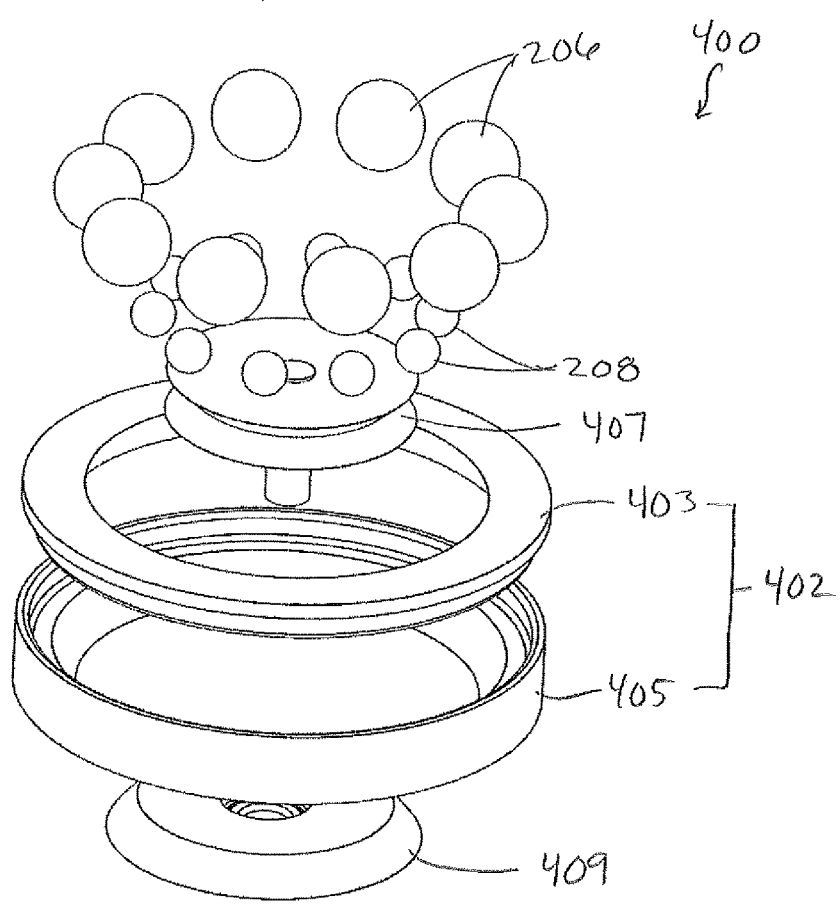
FIG. 14 shows an exploded perspective view of the transmission of FIG. 13.
Figure 15:
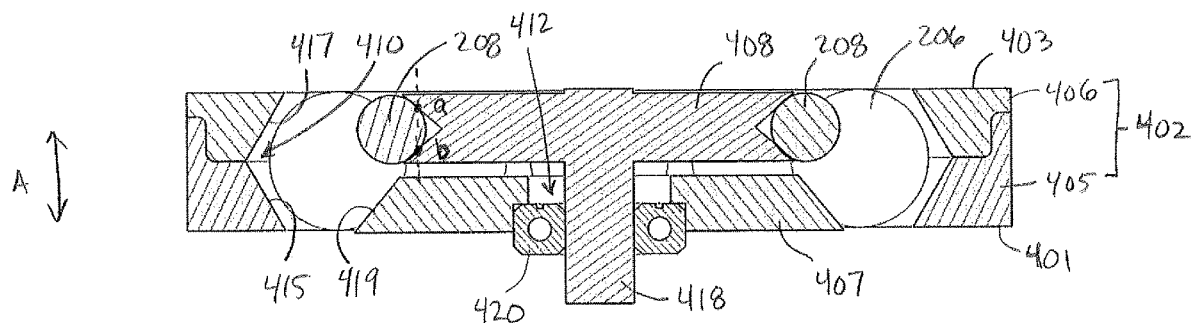
FIG. 15 shows a cross-sectional view of the transmission of FIG. 13 in a plane that extends through two of the separator rolling elements.
Figure 16:
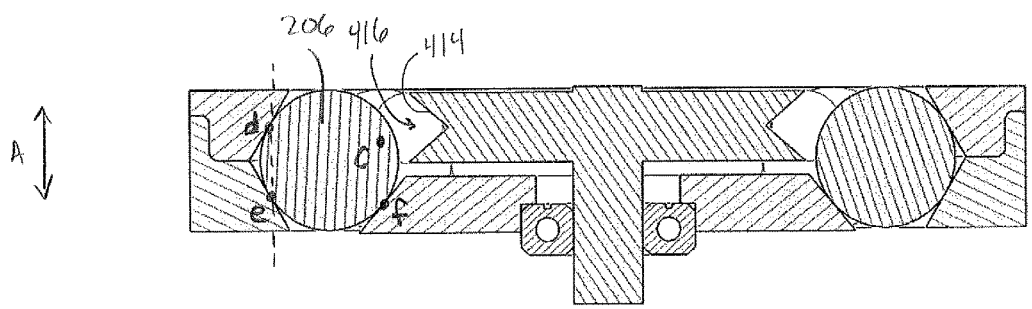
FIG. 16 shows a cross-sectional view of the transmission of FIG. 13 in a plane that extends through two of the load-bearing rolling elements.
Figure 17:
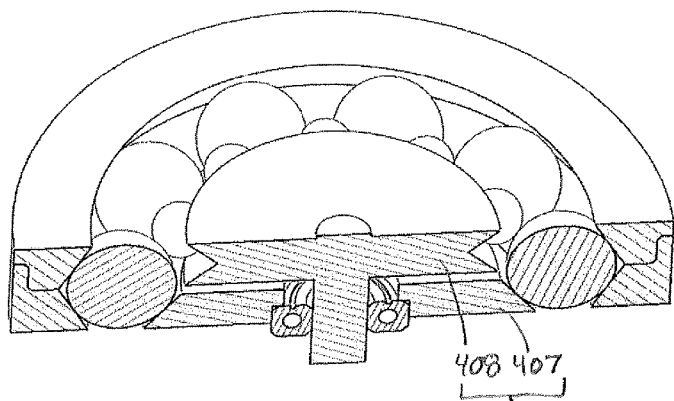
FIG. 17 shows a perspective cross-sectional view of the transmission of FIG. 13 in a plane that extends through two of the load-bearing rolling elements.

Turning now to FIGS. 10 to 12, an example of a transmission 300 is shown. The transmission 300 has an inner race 204, a plurality of load-bearing rolling elements 206, and a plurality of separator rolling elements 208, which are configured as discussed above in relation to FIGS. 6 to 9. Further, the transmission 300 has an outer race 302 that is formed as a two-piece structure. The two-piece structure has first and second outer-race parts 304 and 306 that each extend circumferentially about the central axis. The second outer-race part 306 is offset from the first outer-race part 304 along the axial direction A. For example, the second outer-race part 306 can be in-line with the first outer-race part 304 along the axial direction A. Further, the first and second outer-race parts 304 and 306 are permitted to rotate about the central axis Ac relative to one another. In some examples where the first outer-race part 304 is mounted so as to be stationary and the second outer-race part 306 is permitted to rotate, the first outer-race part 304 can be considered to be a stator, the second outer-race part 306 can be considered to be an output, and the inner race 204 can be considered to be an input. The output can transmit the motion of the input at a slower rate. In other examples, where the first outer-race part 304 is permitted to rotate and the second outer-race part 306 is stationary, the first outer-race part 304 can be considered to be an output, the second outer-race part 306 can be considered to be a stator, and the inner race 204 can be considered to be an input.

The first outer-race part 304 comprises a curved inner wall 314 and a curved outer wall 316, each extending circumferentially about the central axis $C_A$. The curved inner wall 314 is spaced radially inward from the curved outer wall 316 so as to define a channel 320 between the curved inner wall 314 and the curved outer wall 316. The channel 320 can have a generally annular shape. The curved inner wall 314 defines at least one recess 322 that extends into the curved inner wall 314 in a direction that extends towards the central axis $C_A$. The at least one recess 322 can have a generally annular shape. The at least one recess 322 is configured to receive the separator rolling elements 208. The at least one recess 322 can have a cross-section that has substantially "v-shape" as it extends into the curved inner wall 314, a truncated "v-shape" with the bottom of the "v" being flattened, or any other suitable shape. The recess 322 defines two points of contact "a" and "b" with each separator rolling element 208. The two points of contact "a" and "b" can be aligned along a line that is substantially parallel to the central axis $C_A$. Each separator rolling element 208 can further have a point of contact "c" with each load-bearing rolling element 206 of a respective pair of load-bearing roller elements 206.

The first outer-race part 304 can comprise an end wall 318 that extends from the curved inner wall 314 to the curved outer wall 316. The curved outer wall 316 has a tapered end surface 315, opposite the end wall 318. The end surface 315 is tapered inwardly as the end surface 315 extends towards the end wall 318. The second outer-race part 306 comprises a tapered end surface 317 that tapers inwardly as it extends away from the end wall 318. The tapered end surfaces 315 and 317 together define at least one recess 310 configured to receive the load-bearing rotating elements 206. The at least one recess 310 can have a generally annular shape. Further, the at least one recess 310 can have a cross-section that has a substantially "v-shape" as it extends outwardly, a truncated "v-shape" with the bottom of the "v" being flattened, or any other suitable shape. Each load-bearing rolling element 206 has only two points of contact with the outer race 302. The two points of contact include a first point of contact "e" with the first outer-race part 304, and a second point of contact "d" with the second outer-race part 306. The first and second points of contact "e" and "d" are offset from one another with respect to a radial direction. For example, the second point of contact "d" can be offset radially outward from the first point of contact "e".

The curved inner wall 314 and the curved outer wall 316 each have a height $H_1$ and $H_2$, respectively, measured from the first end 201 along the axial direction A. The height $H_1$ of the curved inner wall 314 can be smaller than the height $H_2$ of the curved outer wall 316, although examples of the disclosure are not so limited. The curved inner wall 314 is disposed between the first end 201 and the inner race 204 along the axial direction A. For example, the curved inner wall 314 can be in-line with the inner race 204 along the axial direction A. The curved inner wall 314 and the inner race 204 each have an inner surface (326 and 224, respectively) that faces the central axis $C_A$. The inner surface 224 of the inner race 204 has a diameter $D_1$ that is smaller than a diameter $D_2$ of the inner surface 326 of the curved inner wall 214.

The transmission 300 has a radius $R_o$ measured from the central axis $C_A$ to an outer contact point "d" between the second outer-race part 306 and a respective one of the load-bearing rolling elements 206. The transmission has a radius $R_i$ measured from the central axis $C_A$ to an inner contact point "f" between the inner race 204 and the respective one of the load-bearing rolling elements 206. The transmission has a length $R_{bs}$ measured from a central axis of the respective one of the load-bearing rolling elements 206 to the outer contact point "e" of the first outer-race part 304. The transmission has a length $R_{bo}$ measured from the central axis of the respective one of the load-bearing rolling elements 206 to the outer contact point "d" of the second outer-race part 306. The transmission has a length $R_{bi}$ measured from the central axis of the respective one of the load-bearing rolling elements 206 to the inner contact point "f". The apparatus can define an output-to-input speed ratio N that is substantially equal to $$\frac{R_i}{R_o} \frac{R_{bs} - R_{bo}}{R_{bi} + R_{bs}}.$$

If the length $R_{bo}$ is set equal to the length $R_{bs}$, then the contact geometry is substantially similar to that of bearing 200, and the second outer-race part 306 will not rotate relative to the first outer-race part 304. By offsetting the contact points "d" and "e", relative rotation between parts 304 and 306 can be achieved. Theoretically any ratio can be achieved (including negative ratios in which the motion of the output is in the opposite direction as the input), but realistically, the maximum ratio may be limited by the precision of manufacturing and stiffness of the materials. For example, a 1:1000 reduction could be created with the following dimensions: $R_i=0.5$, $R_o=1$, $R_{bs}=0.5$, $R_{bo}=0.502$, and $R_{bi}=0.5$. If the units of these dimensions were in inches, then a manufacturing precision better than 0.001" might be needed.

Turning now to FIGS. 13 to 17, a transmission 400 according to another example is shown. The transmission 400 comprises a plurality of load-bearing rolling elements 206, and a plurality of separator rolling elements 208 that are configured in a manner similar to that discussed above. Further, the transmission 400 includes an outer race 402 and an inner race 404 that are configured in a manner different from that discussed above. The transmission 400 has a first end 401 and a second end 403 that are spaced from one another along an axial direction A that is parallel to a central axis $C_A$ of the transmission 400. The outer race 402 extends circumferentially about the central axis $C_A$. The outer race 402 is formed as a two-piece structure. The two-piece structure has first and second outer-race parts 405 and 406 that each extend circumferentially about the central axis $C_A$. The second outer-race part 406 is offset from the first outer-race part 405 along the axial direction A. For example, the second outer-race part 406 can be in-line with the first outer-race part 405 along the axial direction A. Further, the first and second outer-race parts 405 and 406 can be coupled to one another so as to be rotationally fixed about the central axis $C_A$ relative to one another. The outer race 402 can be considered a stator.

The inner race 404 is disposed within the outer race 402 and extends circumferentially about the central axis $C_A$ so as to be coaxial with the outer race 402. The inner race 404 is formed as a two-piece structure. The two-piece structure has first and second inner race parts 407 and 408 that each extend circumferentially about the central axis $C_A$. The second inner-race part 408 is offset from the first inner-race part 407 along the axial direction A. For example, the second inner-race part 408 can be in-line with the first inner-race part 407 along the axial direction A. Further, the first and second inner-race parts 407 and 408 can be coupled to one another such that the first and second inner-race parts 407 and 408 rotate about the central axis $C_A$ relative to one another. The first inner-race part 407 can be considered an output, and the second inner-race part 408 can be considered an input.

The plurality of load-bearing rolling elements 206 are disposed between the inner race 402 and the outer race 404, and are spaced circumferentially from one another so as to not contact one another. Each separator rolling element 208 is disposed between a respective pair of the load-bearing rolling elements 206 such that the separator rolling element 208 is in rolling contact with the load-bearing rolling elements 206 of the respective pair and with the outer race 402. The load-bearing rolling elements 206 are in rolling contact with the outer race 402, the inner race 404, and the separator rolling elements 208. The transmission 400 can have an equal number of load-bearing rolling elements 406 and separator rolling elements 408.

In this example, each of the load-bearing rolling elements 206 and each of the separator rolling elements 208 has a spherical shape. The outer surface of each separator rolling element 208 is in rolling contact with the load-bearing rolling elements 206 of a respective pair of the load-bearing rolling elements 206, and with the inner race 404. The separator rolling elements 208 each have an outer-most diameter $D_S$ that is smaller than an outer-most diameter $D_L$ of each load-bearing rolling element 206. Further, the separator rolling elements 208 each have a geometric center that is disposed on a first circle, and the load-bearing rolling elements 206 each have a geometric center that is disposed on a second circle that has a diameter that is larger than that of the first circle.

The first outer-race part 405 comprises a first tapered interior surface 415 that is tapered radially outward as the first tapered interior surface 415 extends towards the second outer-race part 406 along the axial direction A. Similarly, the second outer-race part 406 comprises a second tapered interior surface 417 that is tapered radially outward as the second tapered interior surface 417 extends towards the first outer-race part 405 along the axial direction A. The tapered interior surfaces 415 and 417 together define at least one recess 410 configured to receive the load-bearing rotating elements 206. The at least one recess 410 can have a generally annular shape. The at least one recess 410 can have a cross-section that has a substantially "v-shape" as it extends outwardly, a truncated "v-shape" with the bottom of the "v" being flattened, or any other suitable shape. Each load-bearing rolling element 206 has only two points of contact with the outer race 402. The two points of contact include a first point of contact "e" with the first outer-race part 405, and a second point of contact "d" with the second outer-race part 406. The first and second points of contact "e" and "d" are aligned along a line that extends parallel to the central axis $C_A$.

The first inner-race part 407 has an outer surface 419 that extends circumferentially around the central axis $C_A$ and that contacts the load-bearing rolling elements 206. Each load-bearing rolling element 206 has a single point of contact "f" with the outer surface 419. The outer surface 419 can be tapered inward as it extends towards the second inner race part 409 along the axial direction A. The first inner-race part 407 defines a bore 412 extending therethrough, the bore 412 configured to receive a shaft 418 of the second inner-race part 408.

The second inner-race part 408 has an outer curved surface 414 that extends circumferentially around the central axis A. The outer curved surface 414 can define at least one recess 416 that extends into the second inner-race part 408 towards the central axis $C_A$. The at least one recess 416 can have a generally annular shape. The at least one recess 416 is configured to receive the separator rolling elements 206. The at least one recess 416 can have a cross-section that has a substantially "v-shape," a truncated "v-shape" with the bottom of the "v" being flattened, or any other suitable shape. The recess 416 defines two points of contact "a" and "b" with each separator rolling elements 206. The two points of contact "a" and "b" can be aligned along a line that is substantially parallel to the central axis $C_A$.

The second inner-race part 408 can include a shaft 418 that extends along the central axis $C_A$ through the bore 412 of the first inner-race part 407. The first and second inner-race parts 407 and 408 can be coupled to one another though a ball bearing 420. The ball bearing 420 can have an outer surface that engages an inner surface of the bore 412 of the first inner-race part 407. The ball bearing 420 can have an inner surface that engages the shaft 418 of the second inner-race part 408. The ball bearing 420 permits first and second inner-race parts 407 and 408 to rotate relative to one another about the central axis $C_A$ while constraining other relative translations and rotations between the first and second inner-race parts 407 and 408.

The transmission 400 can be configured such that a separation distance between the first outer-race part and the second outer-race part can be varied. A spring (not shown) can compress the first and second inner-race parts 407 and 408 together along the central axis $C_A$. This compressive force can cause the load-bearing rolling elements 206 to be pushed radially outward against the outer race 402. Applying the compressive force in this manner enables the system to be adjustable to errors in manufacturing as well as having an adjustable friction component. If larger torques are desired on the second inner-race part 408 without slipping, then the compressive force can be increased to increase the normal force and thus friction component to reduce slipping.

By increasing the separation between the two sloped angles 415 and 417, the radius of rotation of the balls may increase which may change the transmission ratio. This can be achieved by increasing the separation between outer-race parts 405 and 406. Note that the first and second inner-race parts 407 and 408 may need to compress further to take up the slack formed by this change. Thus, the transmission ratio can be adjustable if desired. If this change is implemented in a controlled fashion, then the transmission 400 can function as a continuously variable transmission. If the ratios of the geometry are chosen such that the angular velocity of the second inner-race part 408 matches that of the outer race 402, then the transmission 400 can function as an infinitely variable transmission.

The compressive force of the first and second inner-race parts 407 and 408 can impart radial forces on the load-bearing rolling elements 206 because each load-bearing rolling element 206 has two inner contact points "c" and "f" that apply a force to that load-bearing rolling elements 206 that has a radially outward component. The forces of these two contact points imparted onto each primary ball will be equal if the two contact points are aligned along a line that is parallel to the central axis $C_A$. However, they do not need to be equal. In some examples, where the maximum torque delivered is a function of the friction, it may be beneficial to have a larger normal force at contact point "c" as the torques from the first inner-race part 407 (through speed reduction) may be much smaller than those of the second inner-race part 408. Thus the geometry can be designed as shown in FIGS. 13 to 17 such that the contact point "c" results in greater normal forces on the load-bearing rolling elements 206 than the contact point "f".

Since the surfaces of transmission 300 and 400 have limited to no sliding contact with one another, the transmissions 300 and 400 can be operated with little or no lubrication. In fact, higher friction on the load-bearing rolling elements 206 may be desirable as the output force may be limited by the maximum static friction force between the rolling surfaces. As a speed reducer, the relative magnitude of the forces of the different rolling elements may be inversely proportional to the speed. So, the tangential force between the input and the load-bearing rolling elements 206 may be lower (by a factor of the transmission ratio) than the forces between the output and load-bearing rolling elements 206 and the stator and the load-bearing rolling elements 206. Alternatively, a traction drive fluid may be used to enhance rolling friction performance and any other incidental sliding without severely reducing the friction between the rolling elements.

The simplest model of static friction force is the product of the surface material's coefficient of static friction and the normal force. It may thus be advantageous to have large normal forces between the load-bearing rolling elements 206 and the output and stator. In many applications, external loads are consistently present and can provide a large normal load. For instance, in wheeled vehicle applications, where the transmission is part of a hub motor, the vehicle mass is supported by wheels through the device now acting as a radial bearing. This load provides a normal force to enable larger frictional forces.

In the absence of external loads from the application, normal forces from other added elements can be incorporated into the invention. For example, a device that applies a force between the output and stator pushing them together may add this normal force. Since the two bodies rotate relative to each other, some form of added bearing may also be used (e.g. a spring loaded clamp that uses cageless thrust bearings).

Note that if the transmission 300 or 400 experiences forces larger than the static friction, some portion of the transmission may slip. All three bodies (output, input and stator) interface with the load-bearing rolling elements 206, which is where slip may occur. This slippage may be a limitation in the maximum force. However, this slippage can also be a feature for systems which need to limit large forces that might be transmitted (e.g. sensitive portions such as strain sensors that have catastrophic failures if overstrained).

Transmissions of the present disclosure can have zero or more of the following advantages: a relative small form factor (not much larger than a bearing), relatively low noise (no constant making/breaking contact like gear teeth), relatively low cost manufacturing (no cutting of precision gear teeth, or harmonic gear cups), relatively low cost assembly (no complex retainer, no lubrication), relatively high efficiency especially at high speed, little to no sliding friction losses compared to gear transmissions, and little to no viscous losses as lubricated bearings.

Transmissions of the present disclosure may be used in a wide variety of applications, such as in any product that requires low speed motion and benefits from small form factor, low noise, high efficiency and low cost. The transmissions can be limited by friction, and therefore, transmissions of the present disclosure can be well suited for applications that require low forces. Example categories for applications can include portable medical devices, toys and consumer robotic applications. Specific device examples can include (without limitation) (1) remote camera pan/tilt mechanisms (that require very smooth motion, very low noise, precise low speed, low force motion in a very small low cost package), (2) portable medical devices that supply precise metered chemicals, and (3) small consumer robot mobile base hub wheel actuation (e.g. Roomba vacuums, telepresence robot, Kuri home robot, security robots).

Bearings can be one of the most ubiquitous elements in any rotating device. The primary specifications are efficiency (friction loss), loading capability, lifetime under load and cost. Bearings of the present disclosure can have relatively high efficiency under relatively low load with relatively high cost savings. Bearings of the present disclosure can be used in lower max force applications such as home robotics, medical devices, and other applications with medium force requirements.

Various aspects of the present disclosure can be understood in view of the following examples:

Example 1: An apparatus comprises:
an outer race that extends circumferentially about a central axis; an inner race that is disposed within the outer race and that extends circumferentially about the central axis so as to be coaxial with the outer race;
a plurality of load-bearing rolling elements disposed between the inner race and the outer race, and spaced circumferentially from one another so as to not contact one another; and
a plurality of separator rolling elements, wherein each separator rolling element disposed between a respective pair of the load-bearing rolling elements such that the separator rolling element is in rolling contact with the load-bearing rolling elements of the respective pair.

Example 2: The apparatus of Example 1, wherein the load-bearing rolling elements are in rolling contact with the outer race, the inner race, and the separator rolling elements.

Example 3: The apparatus of Example 1, wherein the separator rolling elements each have a diameter that is smaller than a diameter of each load-bearing rolling element.

Example 4: The apparatus of Example 1, wherein the separator rolling elements each have a geometric center that is disposed on a first circle, and the load-bearing rolling elements each have a geometric center that is disposed on a second circle that has a larger diameter than the first circle.

Example 5: The apparatus of Example 1, wherein the outer race comprises a curved inner wall and a curved outer wall, each extending circumferentially about the central axis, the curved inner wall spaced radially inward from the curved outer wall so as to define a channel between the curved inner wall and the curved outer wall.

Example 6: The apparatus of Example 5, wherein the curved inner wall defines at least one recess that extends into the curved inner wall in a direction that extends towards the central axis, the at least one recess configured to receive the separator rolling elements.

Example 7: The apparatus of Example 5, wherein the curved outer wall defines at least one recess that extends into the curved outer wall in a direction that extends away from the central axis, the at least one recess configured to receive the load-bearing rolling elements.

Example 8: The apparatus of Example 5, wherein the apparatus has a first end and a second end that are spaced from one another along an axial direction that is parallel to the central axis.

Example 9: The apparatus of Example 8, wherein the outer race comprises an end wall that extends at the first end from the curved inner wall to the curved outer wall.

Example 10: The apparatus of Example 8, wherein the curved inner wall and the curved outer wall each have a height measured from the first end along the axial direction, and the height of the curved inner wall is smaller than the height of the curved outer wall.

Example 11: The apparatus of Example 10, wherein the curved inner wall is disposed between the first end and the inner race.

Example 12: The apparatus of Example 11, wherein the curved inner wall and the inner race each have an inner surface that faces the central axis, and the inner surface of the inner race has a diameter that is smaller than a diameter of the inner surface of the curved inner wall.

Example 13: The apparatus of Example 1, wherein the apparatus has an equal number of load-bearing rolling elements and separator rolling elements.

Example 14: The apparatus of Example 1, wherein the apparatus is a bearing, and the outer race that is formed as a one-piece body.

Example 15: The apparatus of Example 1, wherein:
the load-bearing rolling elements each have a cylindrical shape; and
the separator rolling elements each have a cylindrical shaft and an annular collar disposed about the cylindrical shaft.

Example 16: The apparatus of Example 15, wherein the annular collar of each separator rolling element has an outer curved surface that is in rolling contact with the load-bearing rolling elements of the respective pair, and the cylindrical shaft has an outer surface that is in rolling contact with an internal surface of the outer race.

Example 17: The apparatus of Example 15, wherein the outer race has a curved internal contact surface that contacts the load-bearing rolling elements and has an outer race radius $R_s$, the inner race has a curved internal contact surface that contacts the load-bearing rolling elements and has an inner race radius $R_i$, the cylindrical shaft has a shaft radius $R_{c''}$, and the annular collar has a collar diameter $R_{c'}$, and wherein the ratio of $R_{c'}/R_{c''}$ is substantially equal to the ratio of $R_s/R_i$.

Example 18: The apparatus of Example 1, wherein each of the load-bearing rolling elements and the separator rolling elements has a spherical shape.

Example 19: The apparatus of Example 18, wherein each separator rolling element has only two points of rolling contact with the outer race and only one point of contact with a respective one of the load-bearing rolling elements.

Example 20: The apparatus of Example 18, wherein each load-bearing rolling element has only two points of contact with the outer race.

Example 21: The apparatus of Example 20, wherein the two points of contact are aligned along a line that is substantially parallel to the central axis.

Example 22: The apparatus of Example 18, wherein each load-bearing rolling element has only two points of contact with the inner race.

Example 23: The apparatus of Example 22, wherein the two points of contact are aligned along a line that is substantially parallel to the central axis.

Example 24: The apparatus of Example 18, wherein the apparatus defines a ratio $$\frac{R_s}{R_i}$$

that is substantially equal to $$\frac{R_{b\prime}}{R_{b\prime\prime}} \frac{R_{c\prime}}{R_{c\prime\prime}},$$

wherein:
- $R_s$ is a radius measured from the central axis to an outer contact point between the outer race and a respective one of the load-bearing rolling elements;
- $R_i$ is a radius measured from the central axis to an inner contact point between the inner race and one of the load-bearing rolling elements;
- $R_{b\prime}$ is a length measured from a central axis of the respective one of the load-bearing rolling elements to the outer contact point;
- $R_{b\prime\prime}$ is a length measured from the central axis of the respective one of the load-bearing rolling elements to a contact point between the load-bearing rolling element and a separator rolling element;
- $R_{c\prime}$ is a length measured from a central axis of a respective one of the separator rolling elements to a contact point between the respective separator rolling element and one of the load-bearing rolling elements; and
- $R_{c\prime\prime}$ is a length measured from the central axis of the respective one of the separator rolling elements to a contact point between the respective separator rolling element and the outer race.

Example 25: The apparatus of Example 1, wherein the apparatus is a transmission, and the outer race is formed as a two-piece structure.

Example 26: The apparatus of Example 25, wherein the two-piece structure has first and second outer-race parts that each extend circumferentially about the central axis, the second outer-race part being offset from the first outer-race part along an axial direction that is parallel to the central axis.

Example 27: The apparatus of Example 26, wherein the first outer-race part comprises a curved inner wall and a curved outer wall, each extending circumferentially about the central axis, the curved inner wall spaced radially inward from the curved outer wall so as to define a channel between the curved inner wall and the curved outer wall.

Example 28: The apparatus of Example 27, wherein the curved inner wall defines at least one recess that extends into the curved inner wall in a direction that extends towards the central axis, the at least one recess configured to receive the separator rolling elements.

Example 29: The apparatus of Example 27, wherein the first outer-race part comprises an end wall that extends from the curved inner wall to the curved outer wall.

Example 30: The apparatus of Example 29, wherein the curved outer wall has a tapered end surface, opposite the end wall, the end surface being tapered inwardly as the end surface extends towards the end wall.

Example 31: The apparatus of Example 29, wherein the second outer-race part comprises a tapered end surface that tapers inwardly as it extends away from the end wall, wherein the tapered end surfaces of the first and second outer-race part together define a recess configured to receive the load-bearing rotating elements.

Example 32: The apparatus of Example 27, wherein the apparatus has a first end, and a second end spaced from the first end along an axial direction that is parallel to the central axis, and the curved inner wall is disposed between the first end and the inner race.

Example 33: The apparatus of Example 27, wherein the curved inner wall and the inner race each have an inner surface that faces the central axis, and the inner surface of the inner race has a diameter that is smaller than a diameter of the inner surface of the curved inner wall.

Example 34: The apparatus of Example 26, wherein each separator rolling element has only two points of rolling contact with the outer race and only one point of contact with a respective one of the load-bearing rolling elements.

Example 35: The apparatus of Example 26, wherein each load-bearing rolling element has only two points of contact with the outer race.

Example 36: The apparatus of Example 35, wherein the two points of contact include a first point of contact with the first outer-race part, and a second point of contact with the second outer-race part, wherein the first and second points of contact are offset from one another with respect to a radial direction.

Example 37: The apparatus of Example 36, wherein the second point of contact is offset radially outward from the first point of contact.

Example 38: The apparatus of Example 26, wherein each load-bearing rolling element has only two points of contact with the inner race.

Example 39: The apparatus of Example 38, wherein the two points of contact are aligned along a line that is substantially parallel to the central axis.

Example 40: The apparatus of Example 26, wherein the apparatus defines an output-to-input speed ratio N that is substantially equal to $$\frac{R_i}{R_o} \frac{R_{bs} - R_{bo}}{R_{bi} + R_{bs}},$$

wherein:
- $R_o$ is a radius measured from the central axis to an outer contact point between the second outer-race part and a respective one of the load-bearing rolling elements;
- $R_i$ is an inner contact radius measured from the central axis to an inner contact point between the inner race and the respective one of the load-bearing rolling elements;
- $R_{bs}$ is a length measured from a central axis of the respective one of the load-bearing rolling elements to an outer contact point of the first outer-race part;
- $R_{bo}$ is a length measured from the central axis of the respective one of the load-bearing rolling elements to the outer contact point of the second outer-race part; and
- $R_{bi}$ is a length measured from the central axis of the respective one of the load-bearing rolling elements to the inner contact point.

Example 41: The apparatus of Example 26, wherein the first and second outer-race parts are coupled to one another so as to be rotationally fixed about the central axis CA relative to one another.

Example 42: The apparatus of Example 26, wherein the apparatus is configured such that a separation distance between the first outer-race part and the second outer-race part can be varied.

Example 43: The apparatus of Example 42, wherein the separation distance between the first outer-race part and second outer-race part is controllable such that the apparatus forms a continuously variable transmission.

Example 44: The apparatus of Example 42, wherein the separation distance can be set such that an angular velocity of the second inner-race part is equal to an angular velocity of the outer race and the apparatus forms an infinitely variable transmission.

Example 45: The apparatus of Example 1, wherein the apparatus is a transmission, and the inner race is formed as a two-piece structure.

Example 46: The apparatus of Example 45, wherein the two-piece structure has first and second inner-race parts that each extend circumferentially about the central axis, the second inner-race part being offset from the first inner-race part along an axial direction that is parallel to the central axis.

Example 47: The apparatus of Example 46, wherein the first and second inner-race parts are coupled to one another such that the first and second inner-race parts rotate about the central axis CA relative to one another.

Example 48: The apparatus of Example 46, wherein the first inner-race part comprises an outer curved surface that is tapered radially inward as it extends towards the second inner-race part along the axial direction, and the second inner-race part has an outer curved surface that defines at least one recess that extends into the second inner-race part towards the central axis.

Example 49: The apparatus of Example 46, wherein each load-bearing rolling element has only two points of contact with the outer race.

Example 50: The apparatus of Example 49, wherein the two points of contact include a first point of contact with the first outer-race part, and a second point of contact with the second outer-race part.

Example 51: The apparatus of Example 50, wherein the first and second points of contact are aligned along a line that extends parallel to the central axis.

Example 52: The apparatus of Example 49, wherein each load-bearing rolling element has only one point of contact with the inner race.

Example 53: The apparatus of Example 52, wherein the first inner-race part has an outer surface that extends circumferentially around the central axis, and the only point of contact with each load-bearing rolling element is on the outer surface.

Example 54: The apparatus of Example 53, wherein the outer surface is tapered inward as it extends towards the second inner-race part along the axial direction.

Example 55: The apparatus of Example 46, wherein the first inner-race part defines a bore extending therethrough, and the second inner-race part includes a shaft that extends along the central axis through the bore.

Example 56: The apparatus of Example 46, wherein the second inner-race part has an outer curved surface that extends circumferentially around the central axis, and the outer curved surface defines at least one recess that extends into the second inner-race part towards the central axis, the at least one recess configured to receive the separator rolling elements.

Example 57: The apparatus of Example 46, wherein the first and second inner-race parts are coupled to one another though a ball bearing that permits the first and second inner-race parts to rotate relative to one another about the central axis.

While certain example examples have been described, these examples have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements, and/or steps are in any way required for one or more examples or that one or more examples necessarily include logic for deciding, with or without author input or prompting, whether these features, elements and/or steps are included or are to be performed in any particular example. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

What is claimed:

1. An apparatus comprising:
an outer race that extends circumferentially about a central axis, the outer race comprising an outer wall and an inner wall each extending circumferentially about the central axis;
an inner race that is disposed within the outer race and that extends circumferentially about the central axis so as to be coaxial with the outer race;
a plurality of load-bearing rolling elements disposed between the inner race and the outer race, spaced circumferentially from one another so as to not contact one another, and in contact with the inner race and the outer wall of the outer race; and
a plurality of separator rolling elements, wherein each separator rolling element is disposed between a respective pair of the load-bearing rolling elements such that the separator rolling element is in rolling contact with the load-bearing rolling elements of the respective pair and the inner wall of the outer race, wherein the inner wall of the outer race defines a recess such that a central portion of the recess is free of contact with each separator rolling element, wherein the separator rolling elements each have a geometric center that is disposed on a first circle, and the load-bearing rolling elements each have a geometric center that is disposed on a second circle that has a larger diameter than the first circle.

2. The apparatus of claim 1, wherein the load-bearing rolling elements are in rolling contact with the outer race, the inner race, and the separator rolling elements.

3. The apparatus of claim 1, wherein the separator rolling elements each have a diameter that is smaller than a diameter of each load-bearing rolling element.

4. The apparatus of claim 1, wherein the inner wall spaced radially inward from the outer wall so as to define a channel between the inner wall and the outer wall.

5. The apparatus of claim 4, wherein the outer wall defines at least one recess that extends into the inner wall in a direction that extends towards the central axis, the at least one recess configured to receive the separator rolling elements.

6. The apparatus of claim 4, wherein the outer wall defines at least one recess that extends into the outer wall in a direction that extends away from the central axis, the at least one recess configured to receive the load-bearing rolling elements.

7. The apparatus of claim 4, wherein:
the apparatus has a first end and a second end that are spaced from one another along an axial direction that is parallel to the central axis; and
the inner wall and the outer wall each have a height measured from the first end along the axial direction, and the height of the inner wall is smaller than the height of the outer wall.

8. The apparatus of claim 4, wherein the outer race further comprises an end wall that extends at a first end of the inner wall to a first end of the outer wall, wherein the end wall further defines the channel.

9. The apparatus of claim 1, wherein the apparatus has an equal number of load-bearing rolling elements and separator rolling elements.

10. The apparatus of claim 1, wherein the apparatus is a bearing, and the outer race that is formed as a one-piece body.

11. The apparatus of claim 1, wherein:
the load-bearing rolling elements each have a cylindrical shape; and
the separator rolling elements each have a cylindrical shaft and an annular collar disposed about the cylindrical shaft.

12. The apparatus of claim 11, wherein the annular collar of each separator rolling element has an outer curved surface that is in rolling contact with the load-bearing rolling elements of the respective pair, and the cylindrical shaft has an outer surface that is in rolling contact with an internal surface of the outer race.

13. The apparatus of claim 1, wherein each of the load-bearing rolling elements and the separator rolling elements has a spherical shape.

14. The apparatus of claim 13, wherein each separator rolling element has only two points of rolling contact with the outer race and only one point of contact with a respective one of the load-bearing rolling elements.

15. The apparatus of claim 13, wherein each load-bearing rolling element has only two points of contact with the outer race.

16. The apparatus of claim 15, wherein the two points of contact are aligned along a line that is substantially parallel to the central axis.

17. The apparatus of claim 13, wherein each load-bearing rolling element has only two points of contact with the inner race.

18. The apparatus of claim 17, wherein the two points of contact are aligned along a line that is substantially parallel to the central axis.

19. The apparatus of claim 1, wherein the apparatus is a transmission, and the outer race is formed as a two-piece structure that has first and second outer-race parts that each extend circumferentially about the central axis, the second outer-race part being offset from the first outer-race part along an axial direction that is parallel to the central axis.

20. The apparatus of claim 19, wherein the apparatus is configured such that a separation distance between the first outer-race part and the second outer-race part can be varied.

21. The apparatus of claim 1, wherein the plurality of separator rolling elements are further disposed such that an innermost surface of each separator rolling element is in closer proximity to the central axis than innermost surface for each of the load bearing elements of the respective pair of load bearing elements.

22. The apparatus of claim 1, wherein each rolling element is further disposed according to a perfect rolling constraint ratio in relation to the respective pair of load bearing elements, wherein the perfect rolling constraint ratio comprises:

$$\frac{R_{b'}}{R_{b''}} \frac{R_{c'}}{R_{c''}} \cong \frac{R_s}{R_i}$$

wherein:
$R_{b'}$ comprises a distance between a central axis of a load bearing element of the respective pair to a contact point of the load bearing element and the outer race;
$R_{b''}$ comprises a distance between the central axis of the load bearing element and a contact point of the load bearing element with the separator rolling element;
$R_{c'}$ comprises a distance between a central axis of the separator rolling element and the contact point of the load bearing element with the separator rolling element;
$R_c''$ comprises a distance between the central axis of the separator rolling element and a contact point between the separator rolling element and the inner race;
$R_s$ comprises a distance between the central axis and the contact point of the load bearing element and the outer race; and
$R_i$ comprises a distance between the central axis and the central axis of the load bearing element.

23. An apparatus comprising:
an outer race that extends circumferentially about a central axis, wherein the outer race comprises a curved inner wall and a curved outer wall, each extending circumferentially about the central axis, the curved inner wall spaced radially inward from the curved outer wall so as to define a channel between the curved inner wall and the curved outer wall, and wherein the outer race further comprises an end wall that extends at a first end of the curved inner wall to a first end of the curved outer wall, wherein the end wall further defines the channel;
an inner race that is disposed within the outer race and that extends circumferentially about the central axis so as to be coaxial with the outer race;
a plurality of load-bearing rolling elements disposed between the inner race and the outer race, and spaced circumferentially from one another so as to not contact one another; and
a plurality of separator rolling elements, wherein each separator rolling element is disposed between a respective pair of the load-bear rolling elements such that the separator rolling element is in rolling contact with the load-bearing rolling elements of the respective pair, wherein the plurality of separator rolling elements are further disposed such that during relative motion between the inner race and the outer race, a surface velocity for each separator rolling element matches a surface velocity of each of the load bearing elements, and wherein the curved inner wall of the outer race defines a recess such that central portion of the recess is free of contact with each separator rolling element.

24. The apparatus of claim 23, wherein the outer race has an outer height that extends substantially parallel to the central axis, wherein the inner race has an inner height that extends substantially parallel to the central axis, and wherein the inner height is less than the outer height.

25. An apparatus comprising:
an outer race that extends circumferentially about a central axis, the outer race comprising an outer wall and an inner wall each extending circumferentially about the central axis;
an inner race that is disposed within the outer race and that extends circumferentially about the central axis so as to be coaxial with the outer race;
a plurality of load-bearing rolling elements disposed between the inner race and the outer race, spaced circumferentially from one another so as to not contact one another, and in contact with the inner race and the outer wall of the outer race; and
a plurality of separator rolling elements, wherein each separator rolling element is disposed between a respective pair of the load-bearing rolling elements such that the separator rolling element is in rolling contact with the load-bearing rolling elements of the respective pair and the inner wall of the outer race, wherein the inner wall of the outer race defines a recess such that a central portion of the recess is free of contact with each separator rolling element, wherein:
the separator rolling elements each have a geometric center that is disposed on a first circle, and the load-bearing rolling elements each have a geometric center that is disposed on a second circle that has a larger diameter than the first circle;
wherein each of the load-bearing rolling elements and the separator rolling elements has a spherical shape; and
wherein each load-bearing rolling element has only two points of contact with at least one of the outer race and the inner race.

* * * * *

UNITED STATES PATENT AND TRADEMARK OFFICE
CERTIFICATE OF CORRECTION

| | |
|---|---|
| PATENT NO. | : 12,158,181 B2 |
| APPLICATION NO. | : 16/695467 |
| DATED | : December 3, 2024 |
| INVENTOR(S) | : Mark Yim |

It is certified that error appears in the above-identified patent and that said Letters Patent is hereby corrected as shown below:

On the Title Page

Item (73) In Assignee
Under Column no. 1, Line no. 2, Replace:
"Pennsylvania, PA (US)"
With:
--Philadelphia, PA (US)--

In the Claims

Under Column no. 20, Claim 22, Line no. 36, Replace:
"$R_c$" comprises"
With:
--$R_c$" comprises--

Signed and Sealed this
Second Day of September, 2025

Coke Morgan Stewart
*Acting Director of the United States Patent and Trademark Office*